United States Patent [19]

McCarthy et al.

[11] Patent Number: 5,523,338
[45] Date of Patent: Jun. 4, 1996

[54] SYNTHETIC HECTORITE COATED FLEXIBLE FILM

[75] Inventors: Donald C. McCarthy, Outagamie County, Wis.; Donald C. Taber, St. Louis County, Mo.; Debra D. Bowers, Winnebago County, Wis.

[73] Assignee: James River Corporation of Virginia, Richmond, Va.

[21] Appl. No.: 154,328

[22] Filed: Nov. 18, 1993

Related U.S. Application Data

[63] Continuation-in-part of Ser. No. 2,985, Jan. 11, 1993, Pat. No. 5,429,867.

[51] Int. Cl.$^6$ ........................................... C08L 63/00
[52] U.S. Cl. ................ 523/466; 523/400; 428/447; 428/454; 428/35.2; 428/403; 428/407; 428/413
[58] Field of Search ..................... 428/413, 35.2, 428/454, 407, 404, 516, 447, 403, 407; 523/400, 466

[56] References Cited

U.S. PATENT DOCUMENTS

| | | | |
|---|---|---|---|
| 4,374,939 | 2/1983 | Van Fisk, Jr. et al. | 523/139 |
| 4,786,558 | 11/1988 | Sumiya et al. | 428/454 |

*Primary Examiner*—James J. Seidleck
*Assistant Examiner*—Duc Truong
*Attorney, Agent, or Firm*—R. Jonathan Peters

[57] ABSTRACT

A novel two-part coating composition and method for its production are disclosed. The novel coating composition comprises one part including a synthetic hectorite clay and a peptizer such as tetrasodium pyrophosphate. The other comprises a hydrophilic air curable epoxy resin. Films and food pouches made from said film are also disclosed.

10 Claims, No Drawings

SYNTHETIC HECTORITE COATED FLEXIBLE FILM

This application is a continuation-in-part application of Ser. No. 08/002,985, filed on Jan. 11, 1993, now U.S. Pat. No. 5,429,867.

BACKGROUND OF THE INVENTION

1. Field of the Invention

This invention relates to synthetic hectorite coated films. More particularly, this invention relates to a coating composition, especially a two-component coating composition, for coating plastic film, wherein the coating comprises synthetic hectorite of a particular type and an air curable hydrophilic epoxy ester binder so as to obtain a coating which can be applied to a plastic substrate, thereby enhancing one or more properties especially the antistatic properties.

2. Description of Related Art

Synthetic hectorite, commercially available as Laponite from Southern Clay Products, Inc., a subsidiary of Laporte Industries Ltd., has been widely used for a wide variety of purposes including its use for imparting antistatic properties to various materials.

One field where antistatic properties are desireable is in the use of packaging films, particularly packaging films formed from plastic materials. Films of this type are extremely well known in the art and include a wide variety of polyolefin films, in particular polypropylene and polyethylene films, as well as other plastic films such as polystyrene films, polyester films, polycarbonate films, polyamide films, and fluoropolymer films.

There have been two general procedures which have been employed in the art in order to impart antistatic properties to various plastics, the first being the inclusion of various inorganic minerals, including hectorite, into the plastic prior to forming it into a film. The second approach has been to coat plastic films with a coating composition containing various inorganic materials, including synthetic hectorite.

There have been many problems associated with coating films in order to provide a protective layer which has desirable properties and certain of these disadvantages are set forth in U.S. Pat. No. 4,786,588. As is disclosed in this patent, protective layers containing inorganic substances can have insufficient covering properties and the surface of the layer can become rough and/or the coating can flake off during use. One approach towards solving these problems is disclosed in U.S. Pat. No. 4,786,588 in that the inorganic material which is used is modified by treating it with various ions, etc.

A second approach taken in the prior art is disclosed in Japanese publication H3-169540 wherein the plastic films are coated with Laponite and various non-epoxy water-soluble binders and adhesion and other desirable properties are alleged to be improved by the inclusion of kaolin. The Japanese publication teaches that without the addition of kaolin, adequate materials are not prepared.

A third approach is disclosed in U.S. Pat. No. 4,868,048 wherein certain fractions, i.e., neighborite is removed from synthetic hectorite before use thereof as a coating with a non-epoxy binder.

The use of synthetic hectorite as a coating for paper is disclosed in U.S. Pat. No. 4,173,480. According to this patent, photographic sheet material is prepared by sizing paper with gelatin, starch or carboxymethylcellulose, a synthetic hectorite clay, specifically Laponite S, and a polymeric film is overlaid onto the paper.

There is a continuing need to provide an improved coating for plastic films exhibiting improved properties, particularly antistatic properties without impairing other important properties such as blocking and transparency, and wherein the coating firmly adheres to the film and does not separate or flake off during or after processing.

SUMMARY OF THE INVENTION

It has now been found that a coating composition comprising synthetic hectorite of a specific type, with a suitable peptizer such as tetrasodium pyrophosphate, can be admixed or compounded with an air curable, hydrophilic epoxy ester binder, and thereafter coated on a plastic film, such as a polyolefin or polyester film, in order to obtain a product of improved properties.

It has been found that the use of a specific type of epoxy, namely air curable, hydrophilic epoxy esters, enables the successful coating of plastic films particularly suitable for packaging material. The epoxy ester used in the composition of this invention is substantially odorless and has low volatility, and therefore is advantageous as compared to other epoxy resins particularly those cured with amines or phenols.

1. Synthetic Hectorite

The synthetic hectorite which is employed in the novel process and coating composition of this invention is critical. As is known, hectorite is a natural swelling clay useful as a flow control agent in a wide variety of applications. Natural hectorite is relatively rare and occurs contaminated with other minerals such as dolomite and quartz which are difficult and expensive to remove.

Synthetic hectorite was synthesized in the early 1960's and is commercially marketed under the tradename Laponite by Laporte Industries, Ltd., through its subsidiary, Southern Clay Products, Inc.

It is to be immediately understood that there are many grades of Laponite which are marketed and not all of them are operable in the novel process of this invention. At the outset, it is necessary that the Laponite B and Laponite S which contain fluoride ions (the fluoride ions replace a portion of the hydroxyl ions) of approximately 5% by weight. These materials are sometimes referred to as sodium magnesium lithium fluorosilicates.

On the other hand synthetic hectorites, such as Laponite RD, that do not contain any fluoride ions are not operable in the novel process of this invention.

Additionally, a peptizer is included in the formulation of the coating composition. These peptizers include polyvalent phosphates, such as hexametaphosphates (e.g., calgon), and pyrophosphates (e.g., tetrasodium pyrophosphate).

It is to be understood that there are certain grades of Laponite to which a peptizer (e.g., tetrasodium pyrophosphate) has been added by the supplier of the clay. Thus Laponite S contains about 6% by weight tetrasodium pyrophosphate.

In the novel process of this invention, it is crucial that the synthetic hectorite be a sodium magnesium lithium fluorosilicate, i.e., it must contain fluoride ions such as in the products previously set forth, and in order to maintain the hectorite in aqueous dispersion, a suitable peptizer is used. If said fluorosilicate synthetic hectorite, as purchased, does not contain a peptizer, then such is added during the formulation, as explained below.

2. The Epoxy Ester Binder

The second criticality in the novel process of this invention is with regard to the epoxy ester binder.

The art is replete with examples of epoxy resins, most notably an epoxy derived from bisphenol A and epichlorohydrin, useful as binders for a wide variety of materials, but the simple fact remains that the improved results of the invention have been obtained when utilizing an epoxy ester which is hydrophilic and air curable. Moreover, the epoxy ester is advantageous in that it is substantially odorless and has low volatility.

The expression "hydrophilic" is intended to include epoxy esters which are either water soluble or water dispersible.

The air curable hydrophilic epoxy ester is an ester of an epoxy resin modified with a drying oil fatty acid. It is usually prepared as a solution comprising the reaction product of (A) from about 50% to about 65% by weight (based upon the total weight of (A) and (B)) of an epoxy resin ester of a partially conjugated unsaturated fatty acid and (B) from about 50% to about 35% by weight (based upon the total weight of (A) and (B)) of a blend of reactive monomer possessing reactive double bonds, at least one of which must be an unsaturated mono-basic acid in the presence of (II) an alcohol either of a glycol and subsequently reacted with (III) an amine and then (IV) dispersed in water, wherein component (A) is the reaction product of 2,2,bis(hydroxy phenyl)dimethyl methane and epichlorohydrin and has a melting point from about 130 F. to about 230 F. and an epoxide equivalent weight within the range from about 400 to about 1100 and the fatty acids used are straight chain monobasic acids of 16–20, preferably 18, carbon length having double bonds arranged in the chain in amount and position to give an iodine number of 125 to 185, an acid number of from about 180 to 210 and a percentage of conjugation of the double bonds between 20% and 25% wherein the reaction is carried out to an acid number below 10 and the monomer (B) portion consists of a mixture of 20–28% of unsaturated monobasic acids having a polymerizable double bond and 80% to 72% reactive monomers having polymerizable double bond.

Epoxy esters of this type are disclosed in U.S. Pat. No. 4,166,054, the entire disclosure of which is incorporated herein by reference. Typical commercially available epoxy resins useful in this invention are manufactured by Reichhold Chemicals, Inc. under their tradename Epotuf.

The epoxy ester is used in an amount ranging from at least 1.5 wt. %, preferably 2–25 wt. % and most preferably 2.5–5 wt. % based on total composition.

DESCRIPTION OF THE PREFERRED EMBODIMENTS

The plastic film to be used as a substrate in the present invention may be any plastic film including single or composite one, oriented or unoriented one and expanded one.

Representative examples of the film include polyolefin film, polystyrene film, polyester film, polycarbonate film, triacetylcellulose film, cellophane film, polyamide film, polyamide-imide film, aramid film, polyimide film, polyphenylene sulfide film, polyether-imide film, polyether sulfone film, polysulfone film, polyacrylonitrile film, polyvinyl acetate film, polyether-ether-ketone film, polyether ketone film and fluoropolymer films such as polytetrafluoroethylene (PTFE), polychlorotrifluoroethylene (CTFE), poly (ethylene co-tetrafluoroethylene (PE-TFE) poly(ethylene-co-chlorotrifluoroethylene (PE-CTFE), fluorinated perfluoroethylene propylene (FEP) and poly(vinylidene difluoride) (PVDF).

Among them, polyolefin films are preferred because of their low cost. Although the thickness of the plastic film is not limited, it is generally 0.5 mil (12.7 microns) to 10 mils (254 microns), preferably 1 mil (25.4 microns) to 5 mils (127 microns), still more preferably 1.5 mils (38.1 microns) to 4 mils (101.6 microns) from the viewpoints of coatability.

When a composite film is used as a substrate, neither the umber of layers of the composite film nor the production process is limited. However, it is generally produced by co-extrusion, extrusion laminating or adhesive laminating processes As is known in the art, the film can be treated in various ways in order to enhance its ability to provide good adhesion to a subsequently applied coating.

Conventional techniques for creating good adhesion include surface activation methods (e.g., U.S. Pat. Nos. 3,018,189, 4,072,769, and 3,364,056) in which the surface of the film is activated by corona discharge treatment, ultraviolet irradiation treatment, plasma treatment, flame treatment or the like. Of the above, corona discharge treatment is preferred.

The novel process of this invention is carried out by forming an aqueous mixture or dispersion containing from 5 to about 15% weight of a suitable synthetic hectorite containing fluoride ions (a sodium magnesium, lithium fluorosilicate), about 6 to about 10% weight of a peptizer (based on synthetic hectorite), such as tetrasodium pyrophosphate, and at least about 1.5% by weight of the epoxy ester, based on the total composition. The material is thoroughly mixed and then coated upon a plastic film to a thickness ranging from about 1.5–10 microns, preferably 5–7 microns, and subsequently dried. It has been found that the resulting films have excellent properties including antistatic properties, blocking properties, and transparency, and that the coating rigidly adheres to the film.

The particularly preferred embodiment of the novel process of this invention is to coat the plastic film in a printing press wherein color and various designs and/or letters can be imprinted to the film in one operation. The use of printing presses in order to coat films with epoxy esters and inorganic filler is not per se novel and is indeed disclosed U.S. Pat. No. 5,100,934, the entire disclosure of which is herein incorporated by reference.

It has been found that when the novel coating composition of this invention is to be coated via a printing press, other conventional ingredients should be added to the formulation in order to make it suitable for conventional printing operations. Thus, other materials can be included in the coating composition, such as surfactants, dispersion aids and other conventional additives used in coating and printing compositions to facilitate application of the coating compositions to the substrate by rotogravure or other suitable printing and coating processes, e.g., rotogravure, silk screen, flexography, air knife, roll, blade, etc.

The coated films of this invention have many desirable properties. The coating is transparent due to the small particle size of the synthetic hectorite and has a surface resistivity of $10^7$–$10^9$ ohms/sq. The coated film structure is able to dissipate electrostatic potentials generated by moving webs and retains that ability even when tested for months in a 10% relative humidity environment. The coating is adherent to polyolefins that have been subjected to surface modification by methods such as corona, flame, or chemical treatments which increase the polarity of the surface thereby enhancing adhesiveness.

The coating is clear, thermally stable, machinable, antiblocking, and has a low, uniform COF. It is economically viable because it can be applied at commercial speeds on a flexo press or other suitable printing or blade coating apparatus and functions at low coats weights, i.e., about 0.25 to 2 grams per square meter, preferably 0.5–1 gram per square meter. Of course, higher coat weights can be used but no practical advantage is gained. A great deal of emphasis has been placed on developing a formulation that will be viscosity stable in commercial coating or printing operations. This is particularly important because, heretofore, the main applications of synthetic hectorite clays were to make thixotropic gelling structures in cosmetic products, shampoos, toothpastes, etc.

In accordance with one embodiment of the invention, the coating composition is provided as a two-component system. The composition is made by preparing a first batch or mixture comprising an aqueous dispersion of fluoride-containing synthetic hectorite, and desirably a peptizer as a dispersing agent. Also, an antifoaming agent may be incorporated into the admixture. The second batch or mixture comprises an epoxy ester and desired additives to improve adhesion and to stabilize the viscosity of the mixture. Both batches and the final admixtures are prepared by sufficient admixing to ensure wetting of the materials and/or uniform dispersion of all the ingredients. The two mixtures or batches are subsequently admixed, preferably just prior to application, and the resulting admixture or composition is applied as a coating composition to a plastic film. The two-part system is advantageous in that it provides for longer shelf life than a one-part system. Further, the two-component system is advantageous in that it inhibits or prevents the build-up of thixotropy; that is, in time the two components (hectorite and epoxy ester) when admixed tend to gel. Also, if there is excess composition prepared for use later, but provided as a two-component system, the uniformity of coating composition is more aptly assured, especially from the standpoint of viscosity.

Mixing of the ingredients as with a paddle mixer should be sufficient to ensure the substantially complete disagglomerating of particulate to cause wetting of the discrete particles by the liquid epoxy ester and the substantially complete dispersion of the solid particles in the epoxy ester matrix. When good dispersion and wetting are achieved, you substantially inhibit or prevent the agglomeration of particles and the settling out of the hectorite particles. Good uniform dispersion of the particles in the epoxy ester matrix imparts good properties to the end product. The two components or parts are combined and used to coat the plastic film.

The final admixture of the two-component system, which may be mixed in a meter-mix machine, is applied to the plastic film by any suitable coating technique such as by pumping the admixture with a peristaltic pump to a printing press. The resulting coating is allowed to air cure, desirably at a temperature of about 100° to 110° F.

The absence of metal in the film makes many film constructions recyclable and, therefore, environmentally friendly products. Packaging machines, which all have metal detectors to protect consumers from accidentally ingesting metal shavings or other common metallic food contaminants, do not function well with metallized film. Use of the instant antistatic coating eliminates the problems caused by the metal in films. Film clarity also allows the manufacturer to design product viewing windows in the package and to monitor fill heights in process.

A particularly preferred packaging material, especially for granular food products such as coffee, is one which is resealable. Resealable packages per se are known in the art and they usually involve forming a reclosable seal on the surface of a film. Thus, the novel coated films of this invention can be treated with an adhesive to provide superior resealable food pouches. A particularly preferred packaging material involved treating the novel coated films of this invention according to the teaching of U.S. Pat. No. 5,089,320, the entire disclosure of which is herein incorporated by reference.

The following examples will illustrate the instant invention.

EXAMPLE 1

Epotuf 92-737 described in U.S. Pat. No. 4,166,054 was obtained from Reichhold Chemical Company. The Epotuf 92-737 was made water-dispersible by neutralization with dimethylethanolamine and diluted with water. The epoxy ester Epotuf binder had the composition shown in Table 1.

TABLE 1

| Epotuf 92-737 (70% solid) | 32.25 wt. % |
|---|---|
| Dimethylethanolamine | 3.22 wt. % |
| Water | 64.52 wt % |

A sample of fluoride ion containing synthetic hectorite identified as Laponite B was mixed with tetrasodium pyrophosphate in an amount so as to obtain a Laponite composition containing 10% by weight of said tetrasodium pyrophosphate; (a) 17 parts by weight of said tetrasodium phosphate-containing Laponite was mixed with 83 parts by water and combined with (b) the Epotuf binder of Table 1 in the weight ratio of 9:1, i.e., 90 wt. % of (a) and 10 wt. % of (b) were used.

The above was coated on the surface of a composite film having an outer surface layer of high density polyethylene (HDPE), an inner layer of a hydrolyzed copolymer of vinyl acetate and ethylene (an ethylene vinyl alcohol resin), and a backing of a copolymer of ethylene and vinyl acetate. The film was subjected to corona discharge prior to being coated and was about 2.75 mils in thickness and had a tested dyne level of 42.

The film was coated with a #2 Meyer rod to give approximately 1 gram/square meter of coating.

A sheet of film, (6"×10") was taped to a glass plate, corona treated side up (HDPE side). The sheet was coated, the drawdown bar cleaned and the sample dried. Drying was done with a hot air gun down the surface and up the surface, once each way. The gun was held about 3" from the surface. The sample was secured to a piece of cardboard and allowed to dry completely. Thirty samples of each coating were done.
Peel Tests Tests were done by placing a piece of 1" Scotch 600 tape on the coated surface and applying pressure with a 4½ lb. rubber roller. Pressure was applied down and back one time. The tape was pulled from the sample and a visual inspection for coating release was done.
Static Decay Tests Two samples were cut to 5"×3½" and placed in a controlled humidity test chamber at 10% R. H. The samples were conditioned overnight before the first test was done.

Static Decay testing was performed on an Electro-Tech Systems, Inc. static decay meter, model 406B in accordance with Federal Test Method 4046.

To perform a Static Decay test, a sample is placed between two electrodes and +5000 volt of a −5000 volt potential is applied to the sample. The time to dissipate 50% or 90% of the original charge is measured by an electrometer. The charge decays exponentially with time, once the 5000 volt. potential is disconnected. Samples remained in the controlled humidity chamber throughout the test period.

Blocking Tests

Blocking tests were done on a Tetrahedron MTP-14 press to simulate what would happen in a finished roll. Ten samples were cut to 5"×5" sheets. Two sets of five were taped together. This was done because of the curling of the film. Each set was then placed in the press, again being taped down because of the curling.

Haze Test

Haze tests were done on the XL-211 Hazegard System Hazemeter. A sample was placed in the specimen holder. The machine was zeroed and calibrated to 100 with each sample. The reference-open switch was then placed in the open position and the haze value of the sample was read directly.

COF test—Film to Stainless

Coated samples (2½"×4") were taped to a 2"×2" plate, coated side out. This plate was placed on the "runner" steel plate. The steel "runner" was cleaned between each sample with ethyl alcohol. The test was run at 1 inch/minute.

COF Test —Film to Base

Coated samples (2½"×4") were taped to a 2"×2" plate, coated side out. This plate was placed on a piece of base film (3"×10") that was previously taped to the "runner" plate. This base film was changed for each test run. The treated side of the base film (HDPE) was facing up for this test. The test was run at 1 inch/minute.

Heat Seal Test

Heat seal tests were done to determine if the coating would remain on the film when heated. A 2½" strip was heat sealed to another 2½" strip of the same coating. The coated sides were not face to face. The strips were placed on the heat sealer and heat sealed together at 260 F., 40 psi, for 1 second.

Results

The coating of this example wet and coated the film uniformly. It had good adhesion and showed good heat stability when heat sealed at 260° F., 40 psi for 1 second without cracking or discoloration. It passed all the above tests.

EXAMPLES 2 AND 3

These examples will illustrate that not all epoxy binders are operable.

EXAMPLE 2

In this example, a polyfunctional aromatic epoxy resin (not an epoxy ester) identified as RDX 84853, supplied by Phone-Poulenc, was used in place of the epoxy ester of Example 1.

RDX 84853 is a nonionic aqueous dispersion of a polyfunctional aromatic epoxy resin with an average functionality of six. Typical properties are shown in the following table:

TABLE 2

| Typical Properties | |
|---|---|
| Viscosity at 25 C, cps (Brookfield RVT, #5 Spindle, 10 rpm) | 12,000 |
| Nonvolatiles, % | 55 |
| Pounds/gallon | 9.3 |

TABLE 2-continued

| Typical Properties | |
|---|---|
| pH | 8.0 |
| Solvent | water |
| Epoxy equivalent weight, based on solids | 230 |

When the procedure of example 1 was repeated using the above epoxy, the sample would not even wet out (coat) on the film. No additional testing was done.

EXAMPLE 3

In this example an epoxy resin dispersion (not an epoxy ester) identified as RDX 68654, marketed by Rhone-Poulenc, was used in place of the epoxy ester of Example 1.

When the procedure of Example 1 was repeated using the above epoxy, the sample would not even wet out (coat) on the film. No additional testing was done.

RDX 68654 epoxy resin dispersion is a nonionic aqueous dispersion of a modified high molecular weight epoxy resin. It is mechanically stable as supplied in water and 2-propoxyethanol cosolvent and is completely water reducible.

TABLE 3

| Typical Properties | |
|---|---|
| Viscosity at 25 C, cps (Brookfield RVT, #3 Spindle, 100 rpm) | 600 |
| Nonvolatiles, % | 44 |
| Pounds/gallon | 9.0 |
| pH | 8.0 |
| Solvent | |
| % water | 80.5 |
| 2-propoxyethanol | 19.5 |

EXAMPLE 4

This example will illustrate the novel coatings of this invention in a formulations intended to be applied in a printing press.

In the example, an EPOTUF proprietary epoxy ester was used.

The epoxy ester comprises the reaction product of 2,2, bis(4-hydroxy phenyl) dimethyl methane and epichlorohydrin and a mixture of fatty acids each having an 18 carbon straight chain. The fatty acids were 9-octadecenoic acid and linoleic acid. The epoxy ester was prepared in accordance with U.S. Pat. No. 4,166,054. It is shipped by Reichhold Chemical as a mixture of 70 wt. % resin solids, 15 wt. % secondary butanol and 15 wt. % ethylene glycol monobutyl ether.

The antistatic coating of this invention was used as two part system.

Part 1

90 parts or 18% Laponite S containing 10% tetrasodium pyrophosphate in water.

Part 2

10 parts by weight of the following mixture of ingredients.

TABLE 4

| Ingredient | Wt. % | Manufacture | Function |
|---|---|---|---|
| EPOTUF ® | 37.0 | Reichhold Chemical | epoxy-ester polymer binder |
| HV-490 Silicone Emulsion | 4.0 | Dow Corning | slip, mare and scuff resistance, water resistance |
| DC-85 Silicone Elastomer | 4.0 | Dow Corning | slip, mare and scuff resistance, water resistance |
| Foamaster 111 | 5.0 | Henkel | antifoam |
| Dimethylamino-ethanol | 2.3 | Pennwalt Chemical | neutralization of epoxy-ester for water dispersibility |
| A-1120 Silane | 1.0 | Union Carbide | adhesion and alkali resistance |
| Manganose Hydrocure I | 0.5 | Mooney Chemical | drier |
| Active 8 | 0.10 | A.J. Vanderbilt Co. | catalyst for Mn |
| Water | 46.1 | | |

Part 1 and Part 2 were blended and used to coat a polyolefin film using the exact film and procedures of Example 1, the sole exception being the coating composition.

The coated film was tested as in Example 1 and excellent properties were obtained.

EXAMPLE 5

The procedure of Example 4 was repeated with the exception that Manganese HYDROCURE 1 and active 8 were omitted from part 2.

Once again excellent properties were obtained in the fluoride-containing synthetic hectorite coated polyolefin film.

EXAMPLE 6

The procedure of Example 4 was repeated except that the silane was omitted.

The tested film had excellent properties.

EXAMPLE 7

The procedure of Example 4 was repeated except that the silicone was omitted.

The tested film showed excellent properties.

EXAMPLE 8

The procedure of Example 4 was repeated except that both the silane and silicone were omitted.

The tested film exhibited excellent properties.

Examples 6–8 demonstrates that the silane and silicone are not needed in order to form the highly successful coated films of this invention.

The purpose of the silane and/or silicone is to aid in commercial processing since the composition of Examples 6–8 tended to separate and such is obviously not desirable when applying the novel coating on apparatus such as a printing press.

We claim:

1. A two-component air-curable coating composition, which upon admixing, is especially suitable for coating polymeric film, and on curing results in a coating exhibiting a static decay of at least about 90% of accumulated electrical charge in less than about 2 seconds when measured at ±5,000 volts and 10% relative humidity, the first component comprising an aqueous dispersion of synthetic hectorite containing fluoride ions and a peptizer, and the second component comprising an air-curable, hydrophilic epoxy ester.

2. A two-component air-curable coating composition according to claim 1 wherein said epoxy ester is formed by modifying an epoxy with an aliphatic fatty acid having 16 to 20 carbon atoms per acid molecule.

3. A two-component air-curable coating composition according to claim 2 wherein said aliphatic fatty acid contains 18 carbon atoms per molecule.

4. A two-component air-curable coating composition according to claim 1 wherein said aqueous dispersion comprises about 5 to 15 weight percent synthetic hectorite.

5. A two-component air-curable coating composition according to claim 1 wherein said second component comprises about 1.5 to 25 weight percent epoxy ester.

6. A two-component air-curable coating composition according to claim 5 wherein the amount of epoxy ester ranges from about 2.5 to 5 weight percent.

7. A two-component air-curable coating composition according to claim 1 wherein said peptizer is tetrasodium pyrophosphate.

8. A two-component air-curable coating composition according to claim 1 wherein said aqueous dispersion comprises about 5 to 15 weight percent synthetic hectorite, said epoxy ester is formed by modifying an epoxy with an aliphatic fatty acid having 18 carbon atoms per acid molecule, and the amount of epoxy ester in said second component ranges from about 2.5 to 5 weight percent, and said peptizer is tetrasodium pyrophosphate.

9. A two-component air-curable coating composition according to any one of claims 1 through 8 wherein said polymeric film is a composite film.

10. A two-component air-curable coating composition according to any one of claims 1 through 8 wherein said static decay of accumulated electrical charge is less than about 0.2 second.

* * * * *